(12) United States Patent
Keilman et al.

(10) Patent No.: US 7,958,786 B2
(45) Date of Patent: Jun. 14, 2011

(54) FLOW MEASUREMENT SYSTEM AND METHOD USING ENHANCED PHASE DIFFERENCE DETECTION

(75) Inventors: George W. Keilman, Bothell, WA (US); Peter Leigh Bartlett, Bothell, WA (US); Timothy Johnson, Bothell, WA (US)

(73) Assignee: Pacesetter, Inc., Sylmar, CA (US)

( * ) Notice: Subject to any disclaimer, the term of this patent is extended or adjusted under 35 U.S.C. 154(b) by 185 days.

(21) Appl. No.: 12/505,370

(22) Filed: Jul. 17, 2009

(65) Prior Publication Data

US 2010/0011880 A1    Jan. 21, 2010

Related U.S. Application Data

(60) Provisional application No. 61/081,649, filed on Jul. 17, 2008.

(51) Int. Cl.
  *G01F 1/66*  (2006.01)
(52) U.S. Cl. ........................... 73/861.29; 702/48
(58) Field of Classification Search ................. None
  See application file for complete search history.

(56) References Cited

U.S. PATENT DOCUMENTS 4,333,353 A  *  6/1982  Baumoel ................... 73/861.25

* cited by examiner

*Primary Examiner* — Harshad Patel

(57) ABSTRACT

A flow measurement system and method uses enhanced phase detection based on a ratio of amplitudes of summations of two oppositely propagating acoustic signals. A need for direct time measurement and extensive difference calculation is consequently avoided so that in some implementations compact, simple, low power analog circuitry can be used.

23 Claims, 16 Drawing Sheets

VECTOR REPRESENTATION WITH NO FLOW.
THE SUM VECTORS ARE EQUAL IN LENGTH.

VECTOR REPRESENTATION WITH FORWARD FLOW. NOTE 5 DEGREE ADVANCE IN THE A->B SIGNAL AND 5 DEGREE DELAY IN THE B->A SIGNAL. THE SUM VECTORS ARE UNEQUAL IN LENGTH, AND THEIR LENGTH RATIO = 1.1918

FLOW MEASUREMENT SYSTEM AND METHOD USING ENHANCED PHASE DIFFERENCE DETECTION

CROSS-REFERENCE TO RELATED APPLICATIONS

This application claims the benefit of U.S. Provisional Application No. 61/081,649, filed Jul. 17, 2008, and incorporates by reference the U.S. Provisional Application herein in its entirety.

FIELD OF THE INVENTION

The present invention is generally related to flow measurement.

DESCRIPTION OF THE RELATED ART

Transit-time flow meters (TTFM) are used to measure fluid flow in a variety of industrial and biomedical applications. In these systems, an ultrasonic signal is propagated between a pair of opposed transducers positioned upstream and downstream from each other, so that the signal travels with the flow in one direction and against the flow in the other direction. The flow modifies the transit time of the acoustic signals slightly, and can be observed as a change in the signal phase. The phase of a signal traveling in the direction of flow is advanced, while the phase of a signal traveling against the direction of flow is delayed.

Conventional TTFMs use precision time or phase measurement techniques to determine the arrival times of the transit-time signals. The change in transit time is quite small, requiring time resolution of 100 picoseconds or less in typical systems. A gated counter, operating at 10 GHz, would be required to directly resolve 100 picoseconds. This requires high-speed logic which consumes significant power, generates heat, and thus requires an electronic enclosure with a suitable power source and heat removal.

Alternately, the arrival times can be conventionally determined by measuring the phase of the signal. For example, a 10 MHz carrier has a 100 nanosecond period, and 100 picosecond resolution would require measuring phase to 0.36 degrees. This can be achieved using conventional signal processing techniques, such as a local quadrature oscillator operating at 10 MHz and a pair of mixers, to produce a complex baseband signal which is sampled to determine the phase of the incoming signal. Unfortunately, here again, the circuitry is fairly complex and it consumes significant power.

BRIEF DESCRIPTION OF THE SEVERAL VIEWS OF THE DRAWING(S)

DETAILED DESCRIPTION OF THE INVENTION

As discussed herein, a flow measurement system and method uses enhanced phase detection based on a ratio of amplitudes of summations of two oppositely propagating acoustic signals. A need for direct time measurement and extensive difference calculation is consequently avoided so that in some implementations compact, simple, low power analog circuitry can be used having better accuracy.

Figure 1:
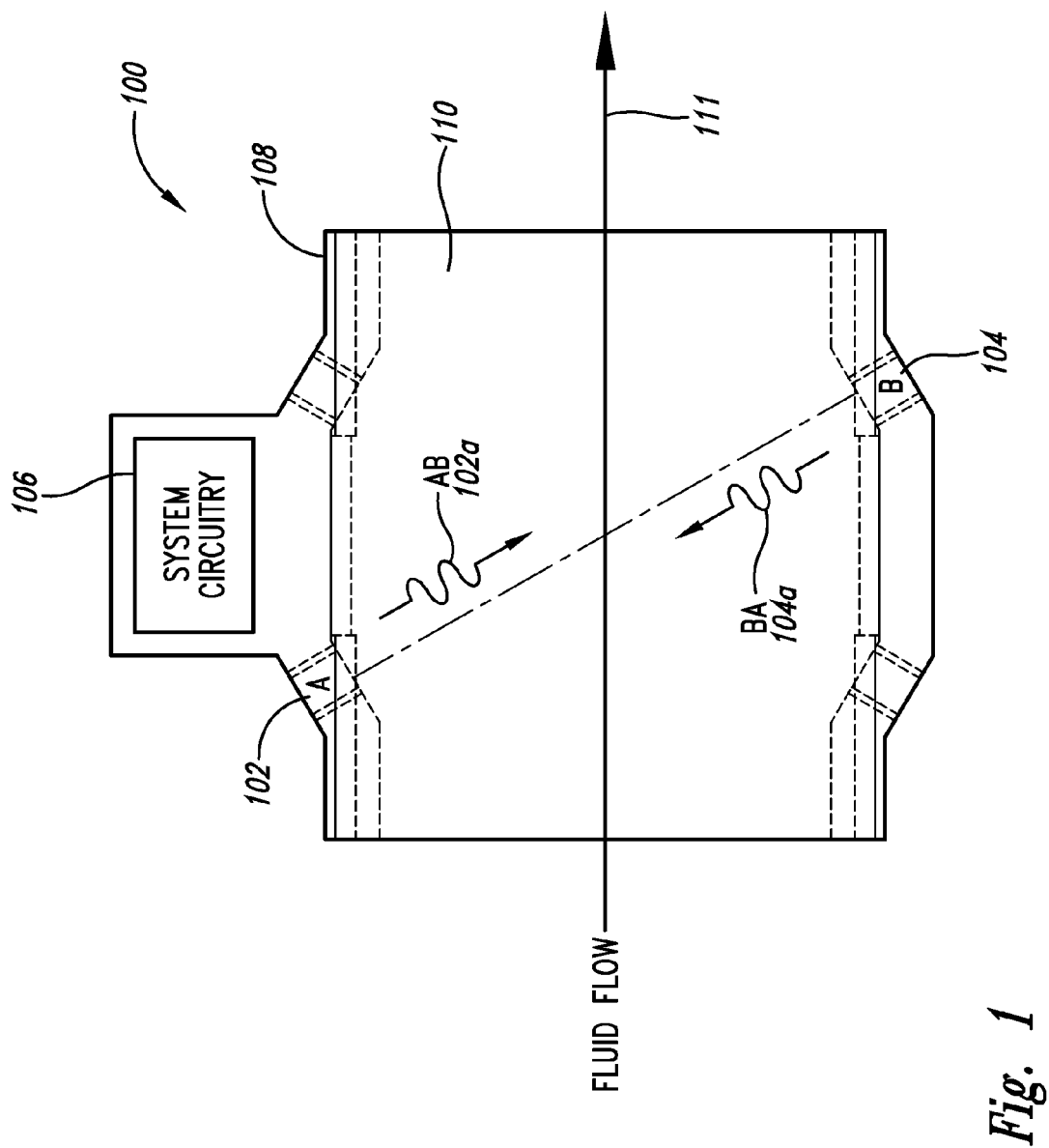
FIG. 1 is a schematic diagram of a flow measurement system using enhanced phase difference detection.

A flow measurement system 100 is shown in FIG. 1 to include a first transducer (A) 102, a second transducer (B) 104, and system circuitry 106 all coupled to a housing 108 with a passageway 110 that allows fluid flow 111 therethrough. The first transducer 102 transmits a first acoustic signal (AB) 102a, which travels with the fluid flow 111 to be received by the second transducer 104. The second transducer 104 transmits a second acoustic signal (BA) 104a, which travels in a direction counter to the first signal 102a and against the fluid flow 111 to be received by the first transducer 102. In some implementations, the first signal 102a and the second signal 104a are transmitted concurrently.

Figure 2:
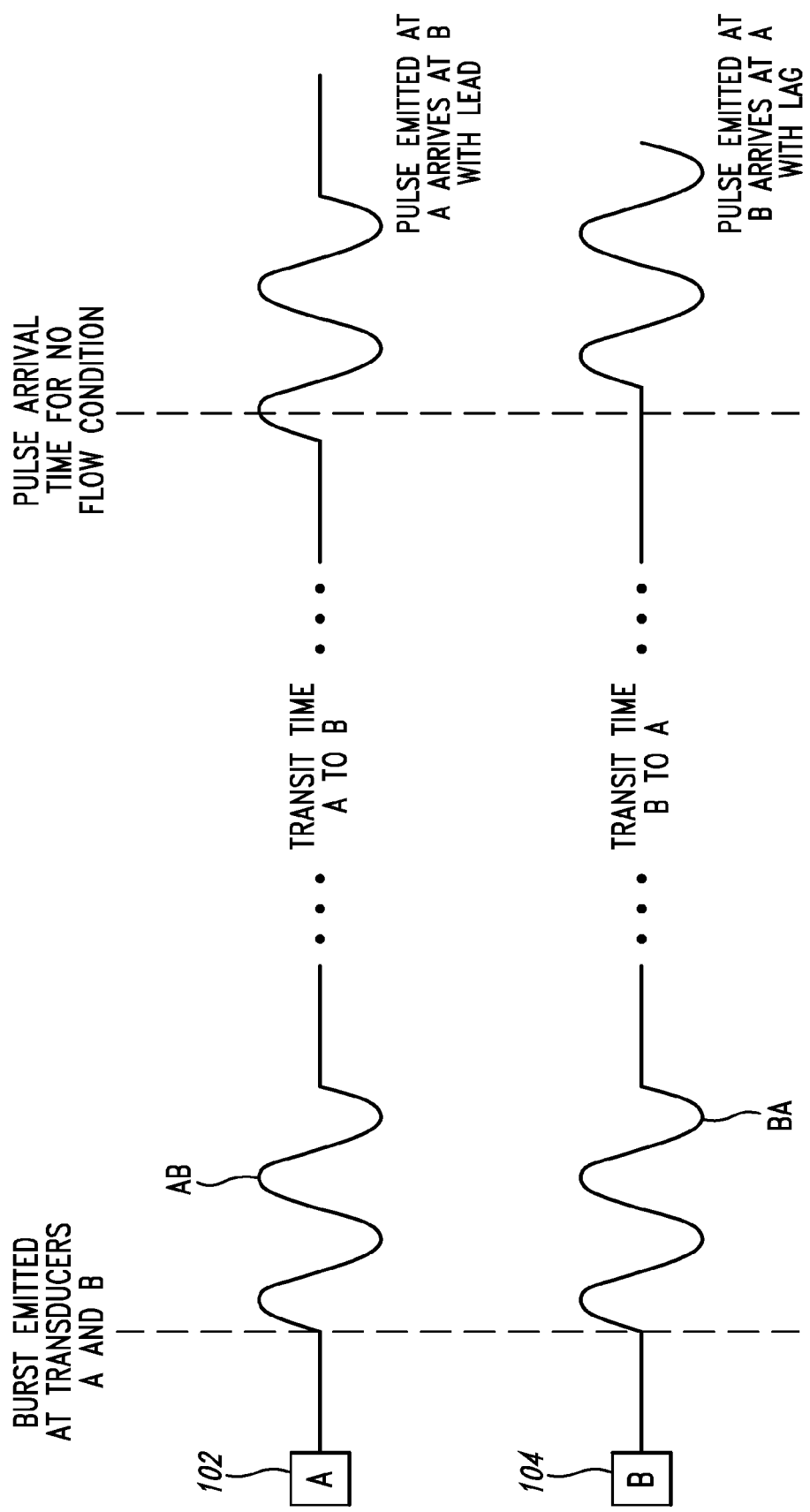
FIG. 2 is a schematic diagram depicting signals used with version of the flow measurement system of FIG. 1.
Figure 3:
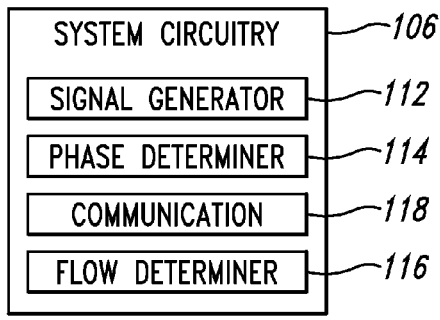
FIG. 3 is a block diagram of system circuitry of the flow measurement system of FIG. 1.
Figure 4:
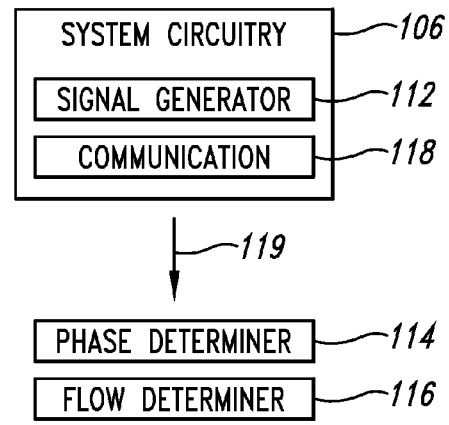
FIG. 4 is a block diagram of an alternate version of the system circuitry of FIG. 3.
Figure 5:
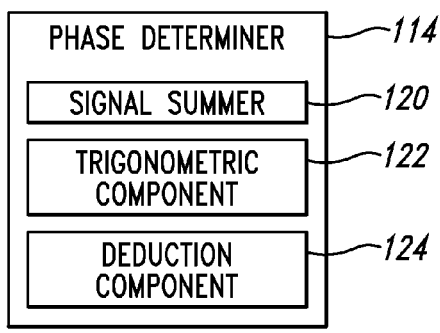
FIG. 5 is a block diagram of a phase determiner of the system circuitry of FIG. 3.

Since the first signal 102a travels with the fluid flow 111 and the second signal 104a travels against the fluid flow, the first signal is received with a lead and the second signal is received with a lag as shown in FIG. 2. Versions of the system circuitry 106 can be comprised of analog electronics. A first version of the system circuitry 106 is shown in FIG. 3 to include a signal generator 112, a phase determiner 114, a flow determiner 115 and communication 118. The signal generator 112 generates the first signal 102a and the second signal 104a. The phase determiner 114 determines phase difference between the first signal 102 after receipt and the second signal 104 after receipt. The flow determiner determines flow rate based upon the determined phase difference. The communication 118 can be used to transmit results of operations by either the signal generator 112 or the phase determiner 114 and the flow determiner 116. A second version of the system circuitry 106 is shown in FIG. 4 with the phase determiner 114 and the flow determiner 116 located away from and wirelessly communicating with the other components of the system circuitry 106. The phase determiner 114 is shown in FIG. 5 to include a signal summer 120, a trigonometric component 122, and a deduction component 124.

As discussed further, phase information is extracted by modifying the transmit waveform in one propagation direction relative to the other. The transit time-of-arrival difference between the first signal 102a and the second signal 104a can be calculated based upon a change in phase between the first signal and the second signal at the point of receipt by the first transducer 102 of the first signal and by the second transducer 104 of the second signal.

The change in phase can be determined based upon an amplitude ratio (A1/A2) as used in the following three trigonometric equations:

$$\frac{\Delta \Phi}{Q} = \frac{8L_p f \sin\Theta}{c^2 D^2} \quad \text{(eqn.1)}$$

$$\frac{\Delta \Phi}{Q} = \frac{8f \tan\Theta}{c^2 D} \quad \text{(eqn.2)}$$

$$\phi = 2 * \text{ARCTAN}(A1/A2) \quad \text{(eqn.3)}$$

where:
$\phi$ = phase shift
$Q$ = flow rate
$f$ = ultrasonic frequency
$c$ = speed of sound in the fluid being measured
$D$ = lumen diameter
$\theta$ = acute angle between the flow vector and acoustic beam
$A1$ = maximum amplitude of first signal summation involving positive shifted second signal
$A2$ = maximum amplitude of second signal summation involving negative shifted second signal Geometry determines the "flow sensitivity," defined as the amount of phase shift for a given flow, is given by equation 1. Of note, the first transducer 102 and the second transducer 104 are offset along the direction of the fluid flow 111 since if they were diametrically opposed across the passageway 110 then Lp=D/cos θ, and the sensitivity reduces to equation 2.

Equations 1-3 are formulated so that apart from subtraction of a constant term described below no other subtraction need be involved. The arithmetic functions performed directly upon the signal values are all addition rather than a combination of addition and subtraction. Without the need performing subtraction directly upon the signal values, circuitry requirements can be simplified resulting in benefits including reduced size and power consumption.

Figure 6:
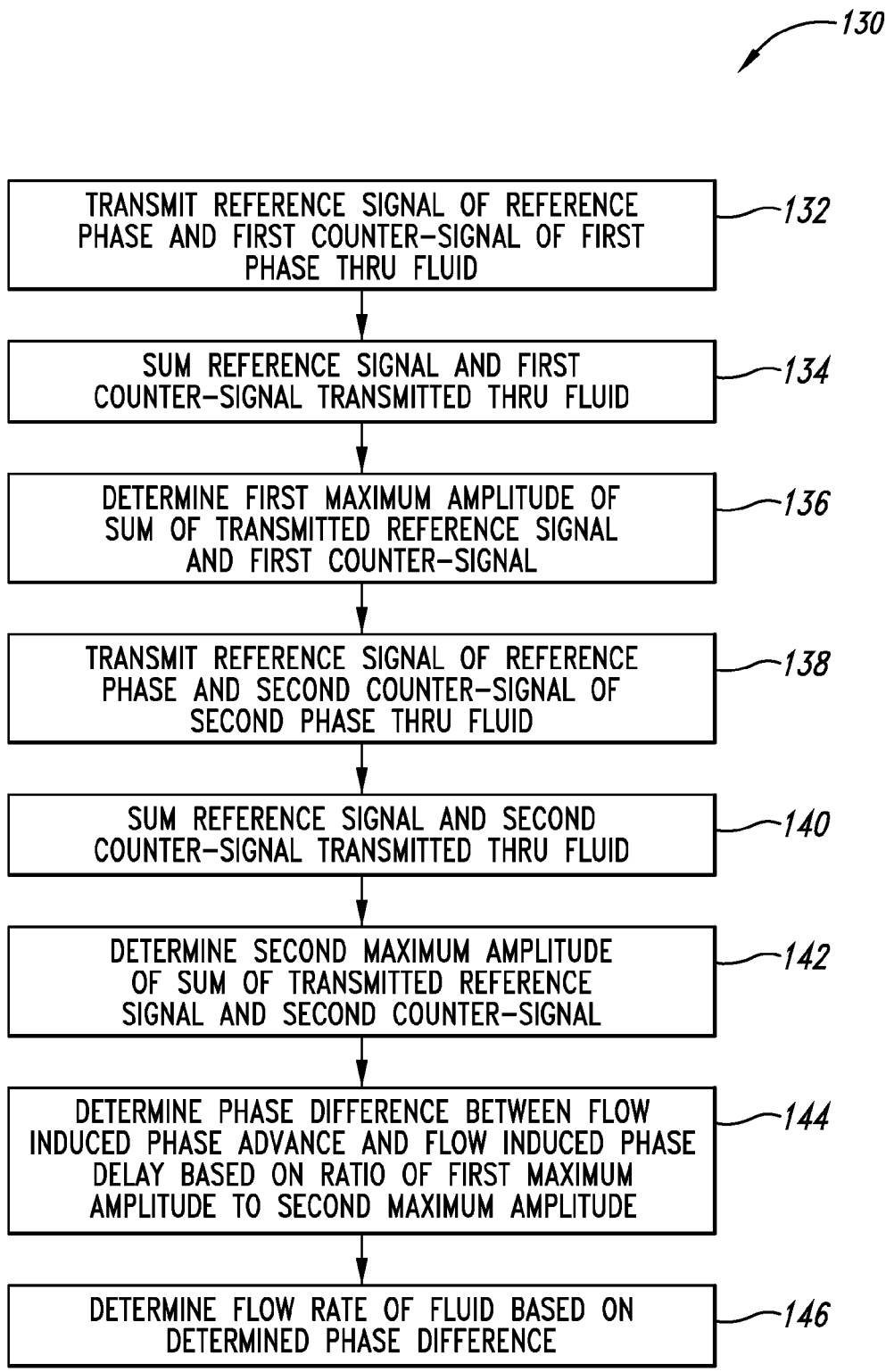
FIG. 6 is a flowchart of a method depicting operational concepts of the flow measurement system of FIG. 1.

A method 130 depicting operational concepts of the system 100 is shown in FIG. 6 to include concurrently transmitting (such as by the first transducer 102) (step 132) a reference signal (such as the first signal 102) having a reference phase (such as zero degrees) and transmitting (such as by the second transducer 104) a first counter-propagating signal (such as the second signal 104) having a first phase shifted a first amount from the reference phase (such as positively shifted by +90 degrees from zero degrees) through the fluid flow 111. The received reference signal and the received first counter-propagating signal are summed together (such as by the signal summer 120) (step 134) and the maximum amplitude (A1 of the equation 3 above) of the sum is determined (step 136).

The reference signal (such as the first signal 102) having a reference phase (such as zero degrees) is transmitted (such as by the first transducer 102) (step 138) concurrent with transmission (such as by the second transducer 104) of a second counter-propagating signal (such as the second signal 104) having a second phase shifted a second amount from the reference phase (such negatively shifted by +90 degrees from zero degrees) through the fluid flow 111. The reference signal is transmitted concurrently with the first counter-propagating signal and concurrently with the second counter-propagating signal. The first counter-propagating signal and the second counter-propagating signal can be transmitted concurrently or at different periods of time. The received reference signal and the received second counter-propagating signal are summed together (step 140) and the maximum amplitude (A2 of the equation 3 above) of the sum is determined (step 142).

The phase difference between the flow induced phase advance and the flow induced phase delay is then determined by the trigonometric component 122 (step 144) based on the A1/A2 ratio as used by Equations 1-3 above and the deduction component 124, which subtracts a constant value from an output of the trigonometric component as further described below. Flow rate is then outputted (step 146) by the flow determiner 116 based upon the determined phase difference between the flow induced phase advance and the flow induced phase delay. The difference in arrival time, together with the conduit geometry, can be factored into calculation of volumetric fluid flow.

Other phase shifts for the first counter-propagating signal and the second counter-propagating signal from the reference phase of the reference signal could also be used, but the +/−90 degree signals as described above are orthogonal to the reference signal, which can provide improved sensitivity and linearity. Some implementations at 10 MHz provides a compromise between power, transducer size, and attenuation, but other frequencies can be used.

Figure 8:
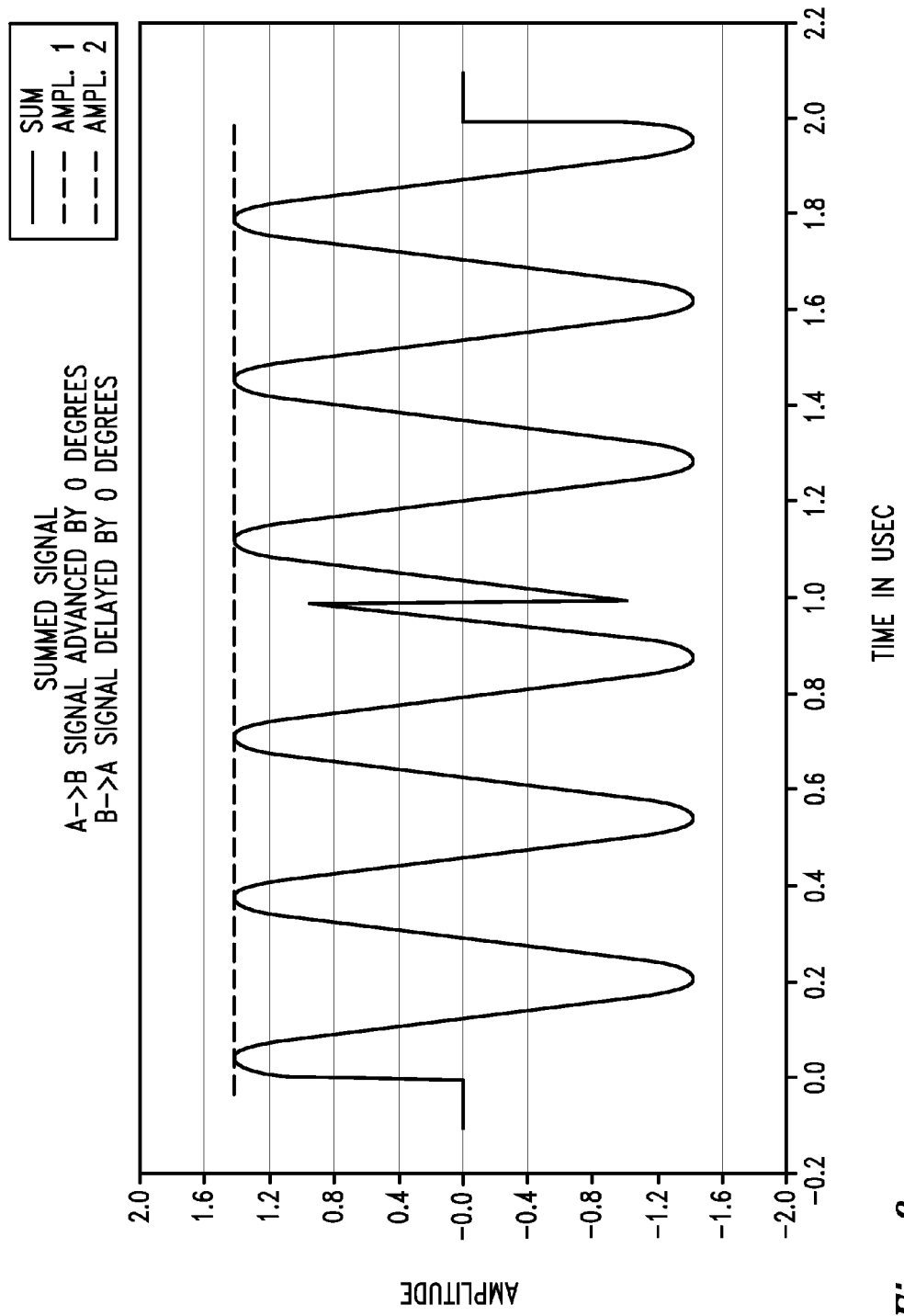
FIG. 8 is a graph depicting summation of the signals of FIG. 7.

As shown in FIG. 8, exemplary waveforms for the first signal (AB) 102 and the second signal 104 (BA) are depicted as being. In this example, there is no fluid flow and no difference in transit times. Note the 180 degree phase shift in the second signal 104 at 1.000 usec.

A 3 MHz carrier frequency and a 2 microsecond burst length were chosen to depict the examples for illustrative purposes. In practice, the transmit burst can typically include many more cycles. The maximum burst length that can be used is determined by the lumen dimensions from:

Lambda=$c/f$=wavelength

Lp=path length=$D/\cos \theta$ (as stated above)

Lp/Lambda=maximum number of RF cycles that can be transmitted

If a longer burst were to be used, the receive signal starts to arrive from the opposed transducer while the signal is still being transmitted, causing interference.

Figure 9:
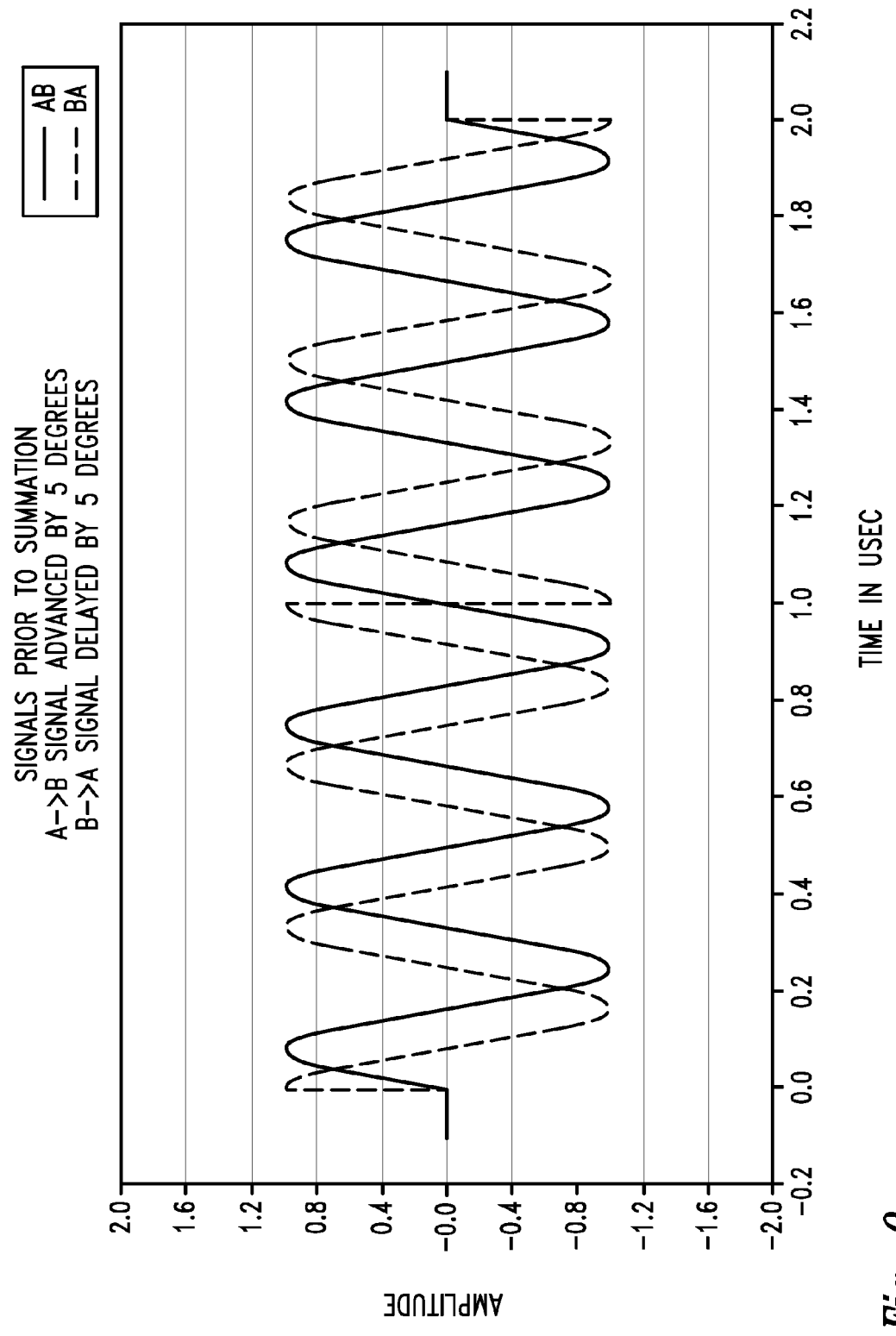
FIG. 9 is a graph depicting separate signals in a first flow condition.

As shown in FIG. 9, results of summing the signals shown in FIG. 3 are depicted. Since there is no fluid flow for the example of FIG. 3 and FIG. 4, there is no flow induced phase advance and no flow induced phase delay so the amplitude ratio (A1/A2) is 1.0000 because both summed signals are equal in amplitude.

Figure 10:
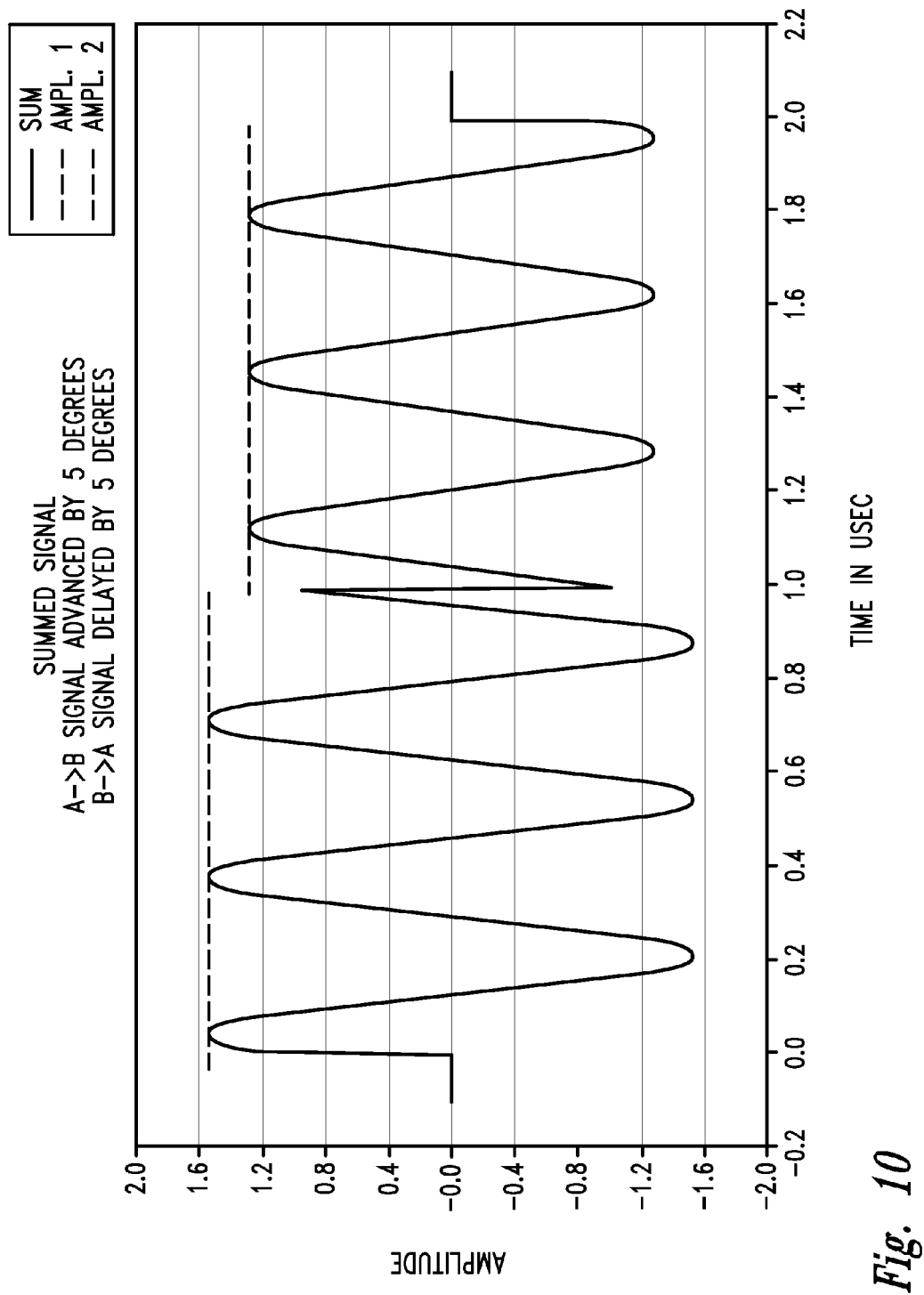
FIG. 10 is a graph depicting summation of the signals of FIG. 9.

As shown in FIG. 10, an example is depicted to have the fluid flow 111 of FIG. 1, with a flow induced 5 degree phase advance for the first signal 102a in the direction of the first transducer 102 to the second transducer 104 and a flow induced 5 degree delay for the second signal 104a in the direction of the second transducer 104 to the first transducer 102. Summation o the signals of FIG. 10 are shown in FIG. 9 with an amplitude ration (A1/A2) of 1.1918. Per eqn. 3 above:

$\phi$=2*ARCTAN (1.1918)=100 degrees

Phase difference between signals=$\phi$−90=10 degrees

As an explanation, for a 0 degree phase advance, φ=90 degrees. Thus, to recover the actual phase difference between the two received signals, it is necessary to subtract 90 degrees from the result of eqn. 3.

Figure 11:
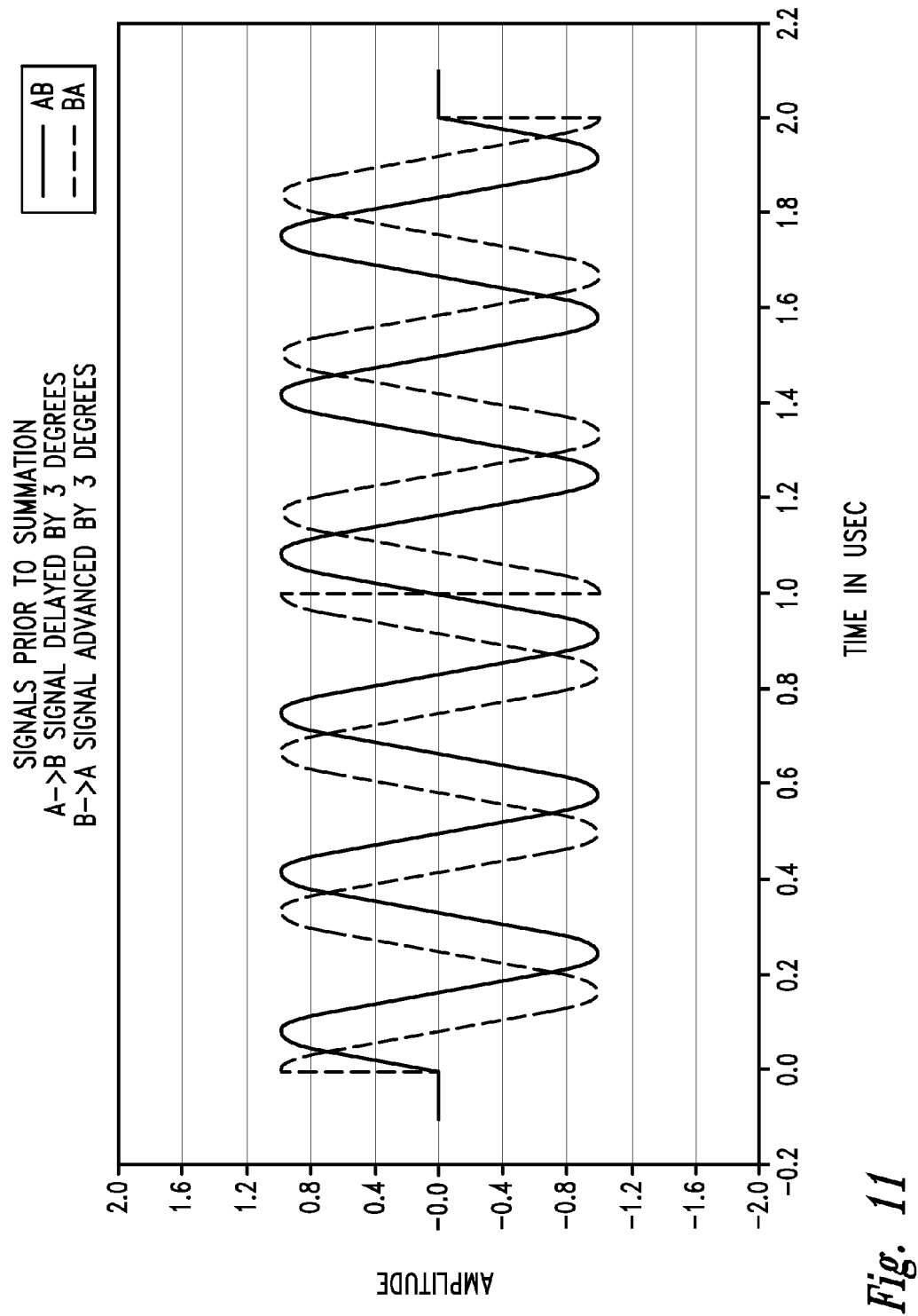
FIG. 11 is a graph depicting separate signals in a second condition of flow.
Figure 12:
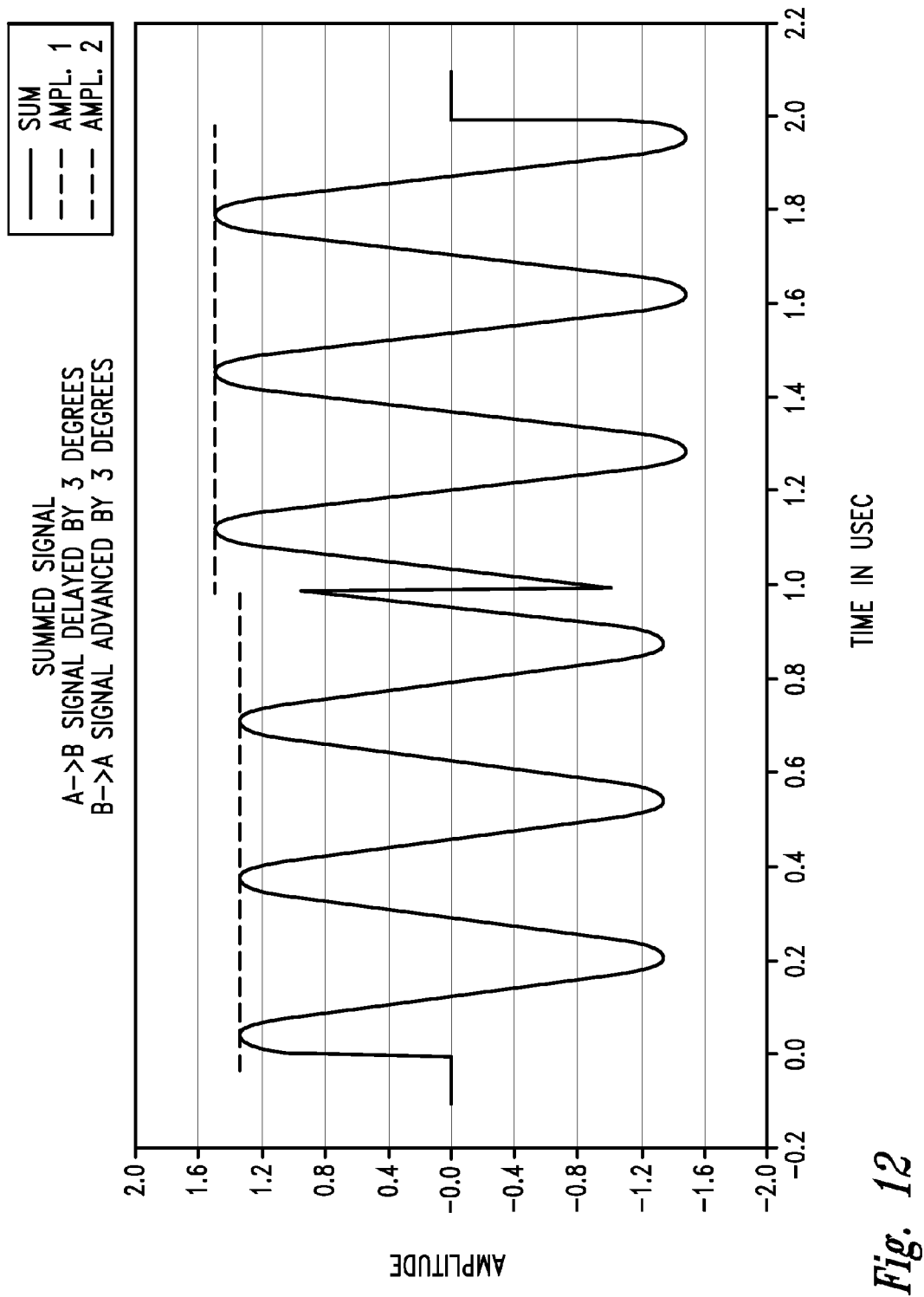
FIG. 12 is a graph depicting summation of the signals of FIG. 11.

As shown in FIG. 11, an example is depicted with flow in a direction opposite to that shown in FIG. 1 which results in a phase shift opposite in direction to that depicted in FIG. 8, i.e., this is a −3 degree shift, due to flow in the opposite direction. FIG. 12 shows the summed signal for FIG. 11. The amplitude ratio (A1/A2) is 0.9004.

Figure 13:
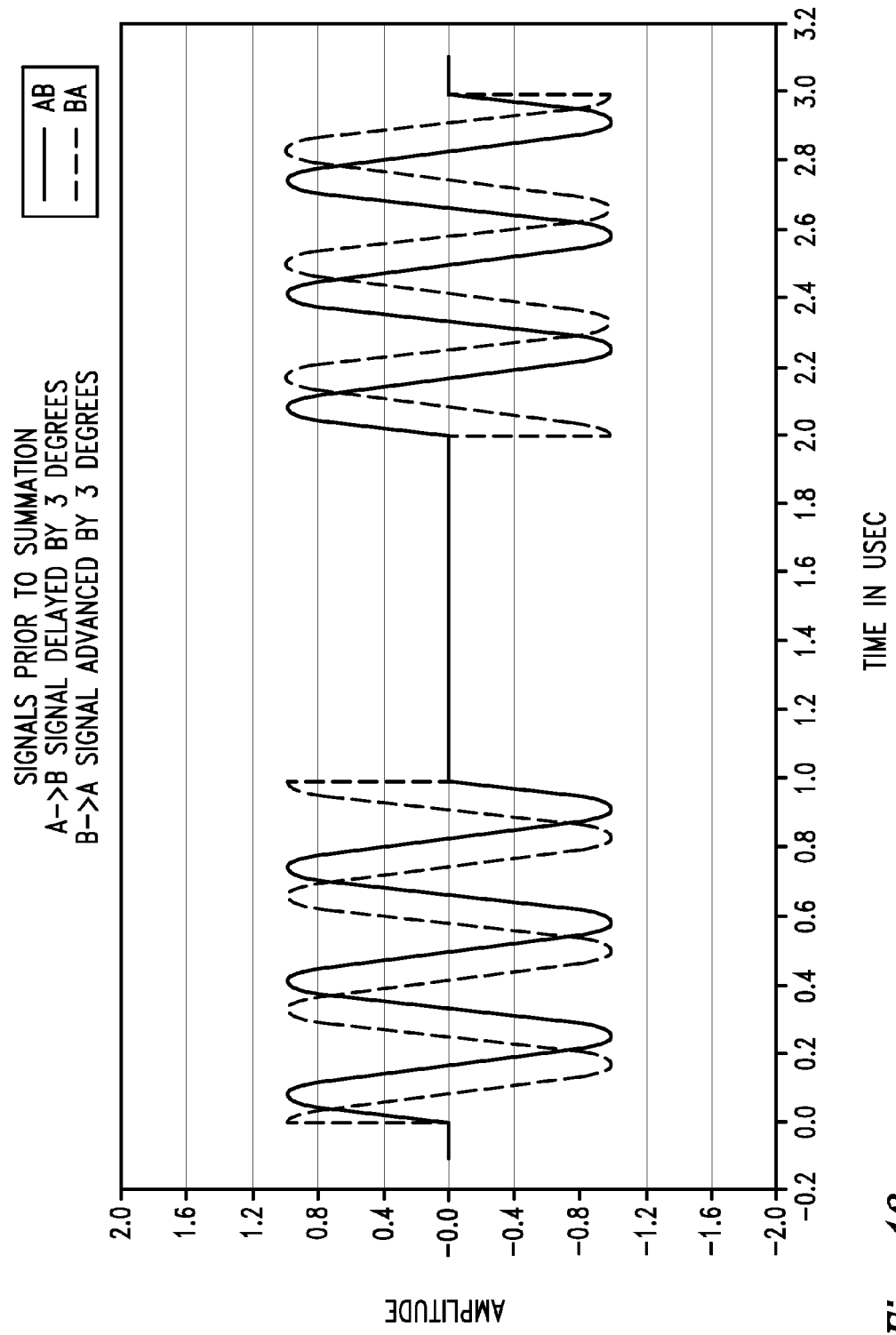
FIG. 13 is graph depicting an alternative version of the separate signals of FIG. 11.
Figure 14:
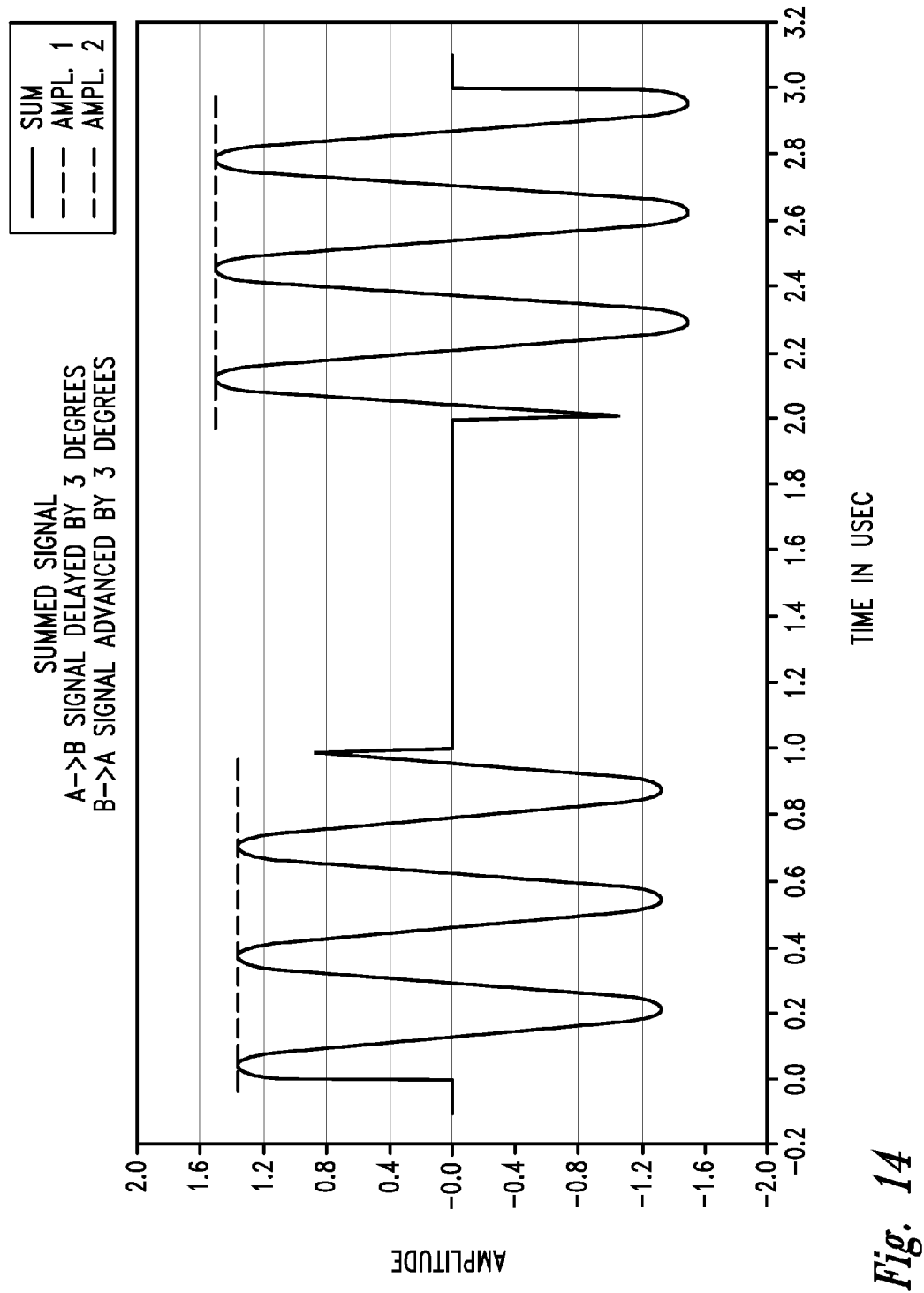
FIG. 14 is a graph depicting summation of the signals of FIG. 13.

FIG. 13 depicts the signal example of FIG. 11, except with a delay between the period of transmitting the first counter-propagating signal and the period of transmitting the second counter-propagating signal. In actual practice, the first counter-propagating signal and the second counter-propagating signal may be alternated or interleaved in some other sequence. FIG. 14 shows the summed signal for FIG. 13. The amplitude ratio is 0.9004, i.e., the same as in FIG. 12.

Figure 7:
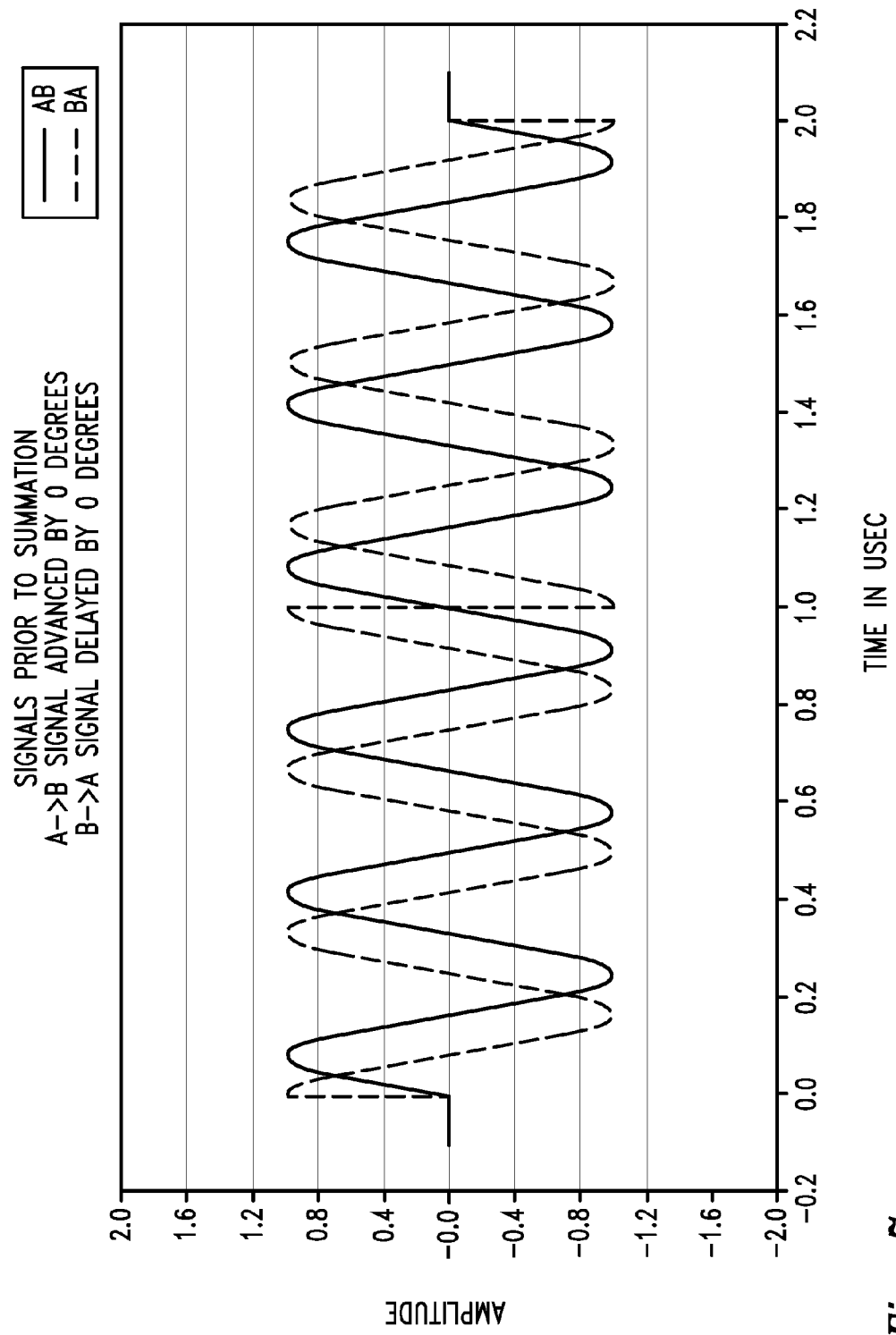
FIG. 7 is a graph depicting separate signals in a no flow condition.
Figure 15:
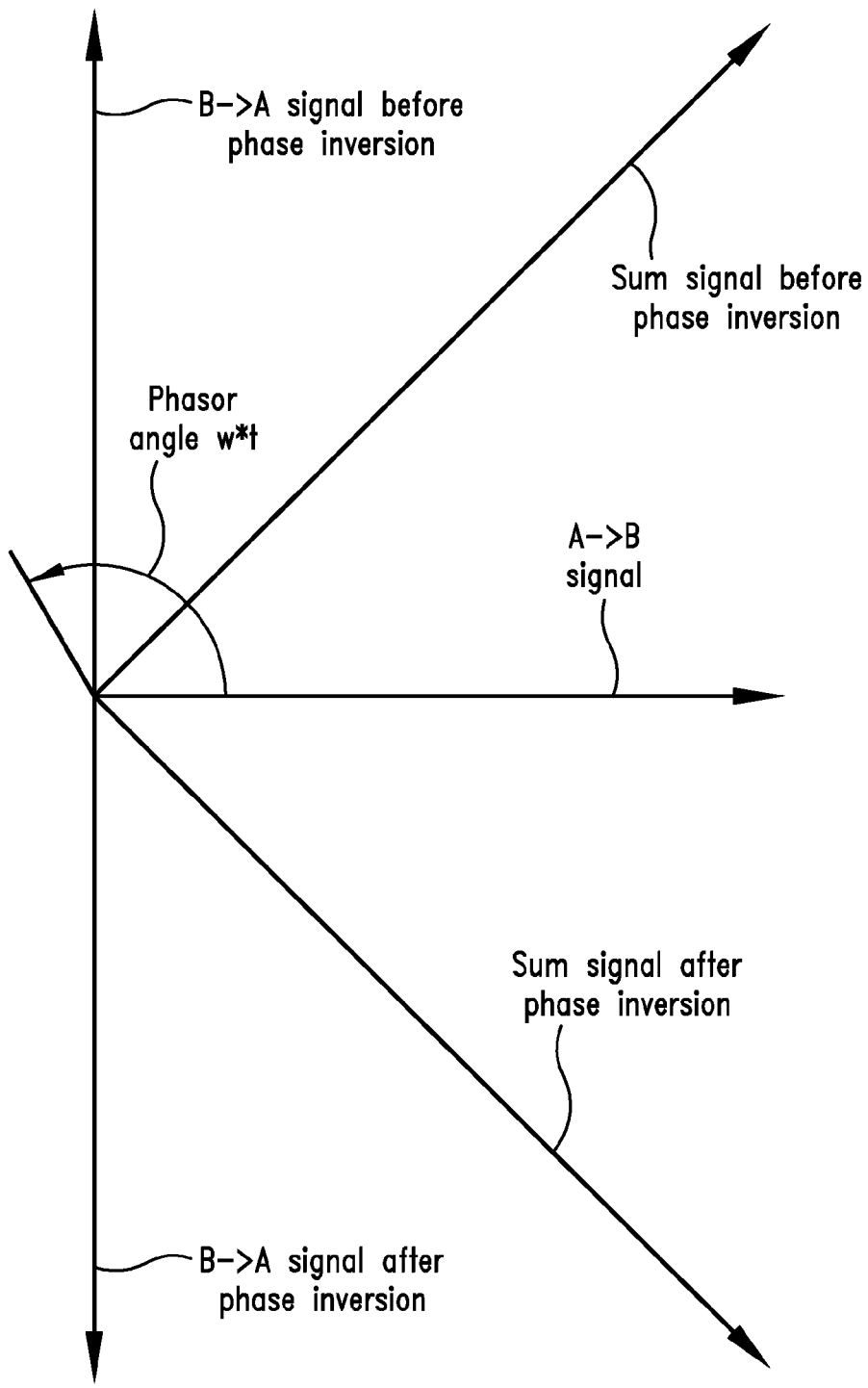
FIG. 15 depicts a vector representation of the signal processing with no flow (zero phase shift), corresponding to FIGS. 7 and 8.

FIG. 15 depicts a vector representation of signal processing with no flow (zero phase shift), corresponding to FIGS. 7 and 8. The horizontal vector at the center represents the first signal (AB) 102a. The two vertical vectors represent the second signal (BA) 104a before and after a 180 degree phase inversion in the drive waveform. The two sum signals, before and after the phase inversion, are at +45 and −45 degrees, respectively. The arc at the center represents the phasor ωt which increases in angle with increasing time. Note that the sum signals are of equal magnitude (length).

Figure 16:
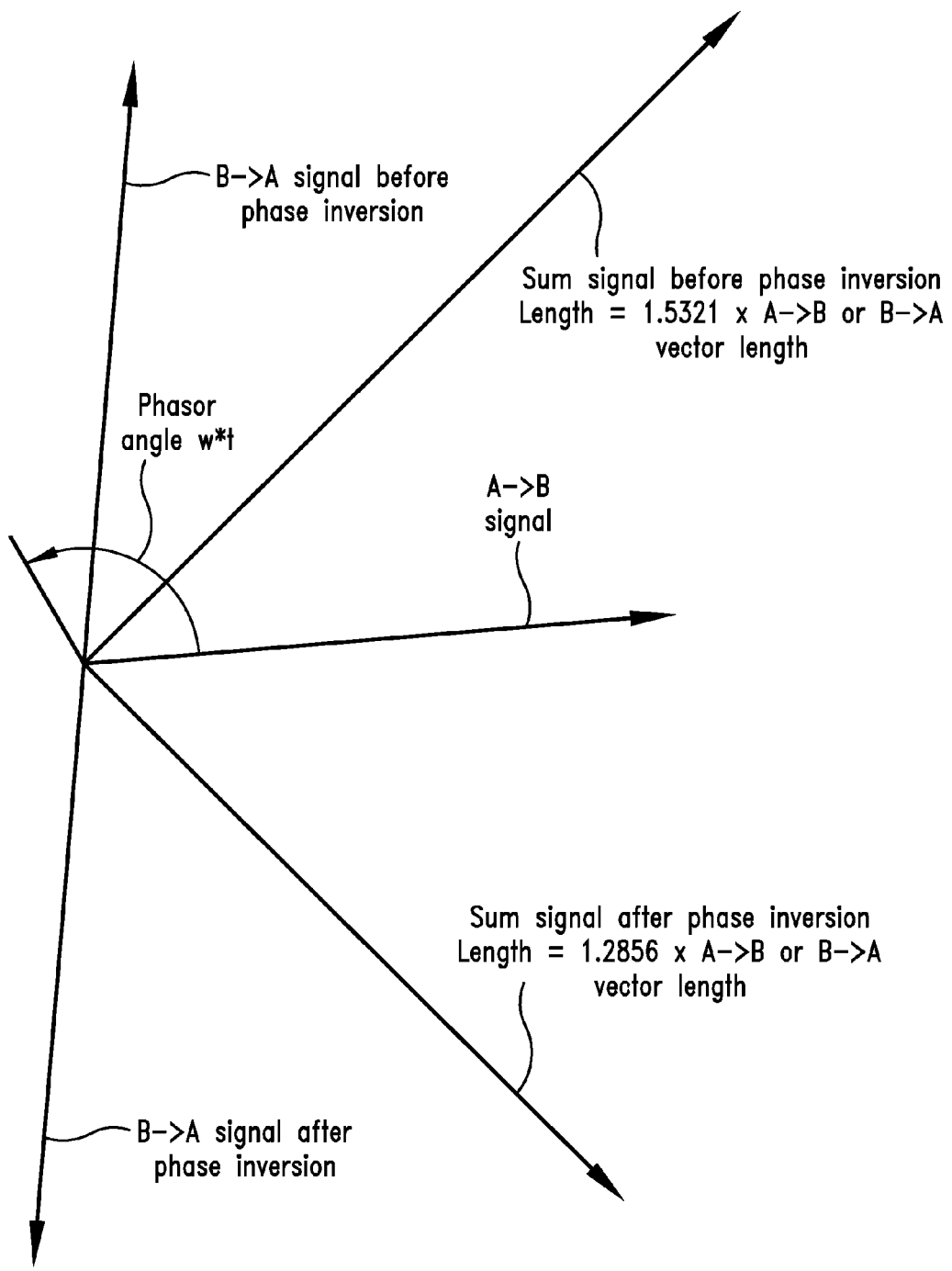
FIG. 16 depicts a vector representation of signal processing with forward flow (per FIGS. 9 and 10)

FIG. 16 depicts a vector representation of signal processing with forward flow (per FIGS. 9 and 10), resulting in a +5° phase shift. The vector at +5° represents the first signal (AB) 102a. The vectors at −95° and +85° represent the second signal (BA) 104a before and after a 180 degree phase inversion in the drive waveform. The two sum signals, before and after the phase inversion, are at +45 and −45 degrees, respectively, but their magnitudes (lengths) are different. Their length ratio is mathematically related to the flow rate, and it is 1.1918 in this example. As noted above in the discussion of FIG. 10, this equates to a 10 degree phase difference.

Figure 17:
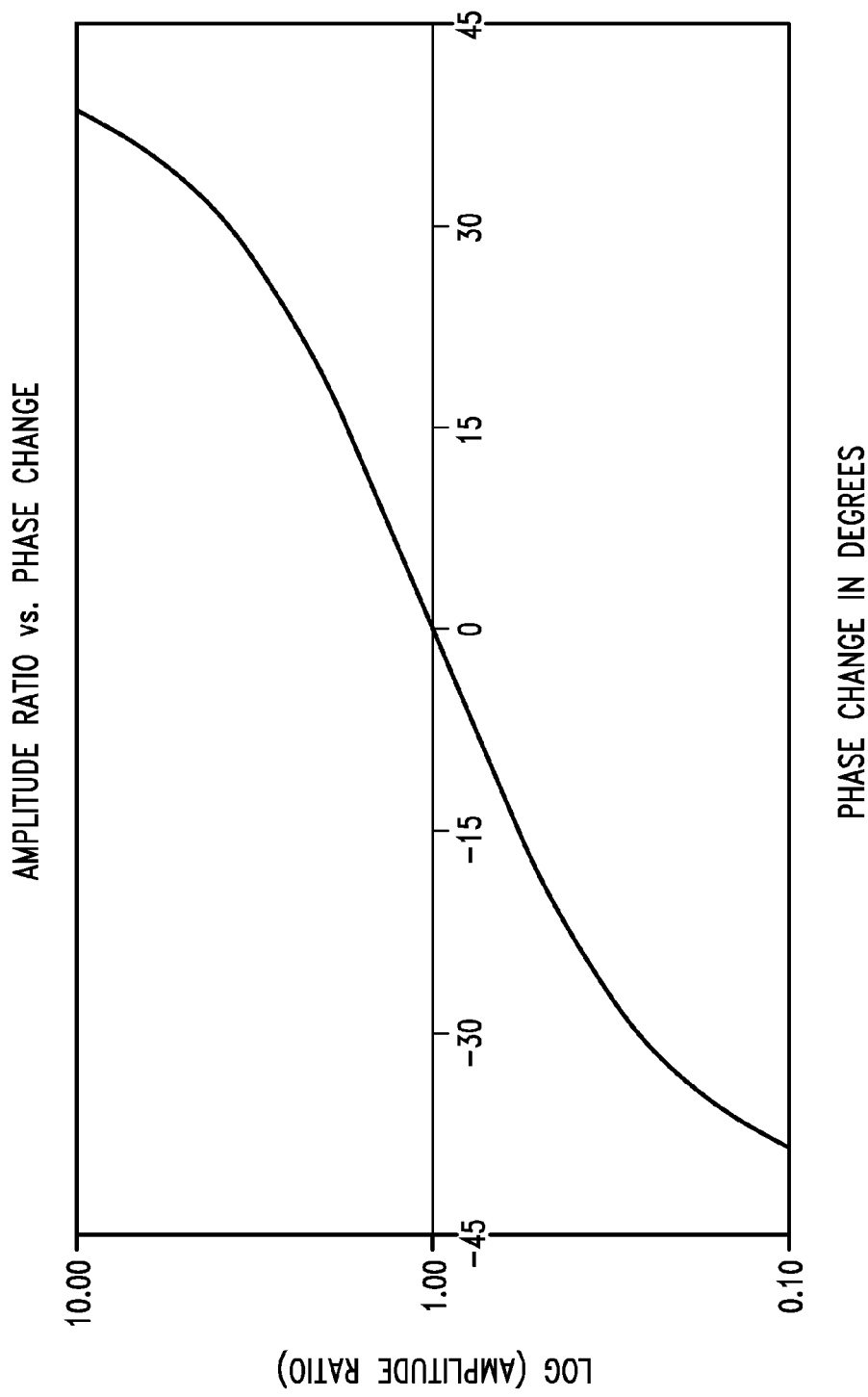
FIG. 17 depicts a logarithmic plot of the amplitude ratio that results from a phase change of a first signal.

FIG. 17 depicts a logarithmic plot of the amplitude ratio that results from a phase change on the first signal (AB) 102a. It should be noted that the second signal 104a (BA) changes by an equal but opposite amount, so the differential phase change is twice the value on the X axis.

Figure 18:
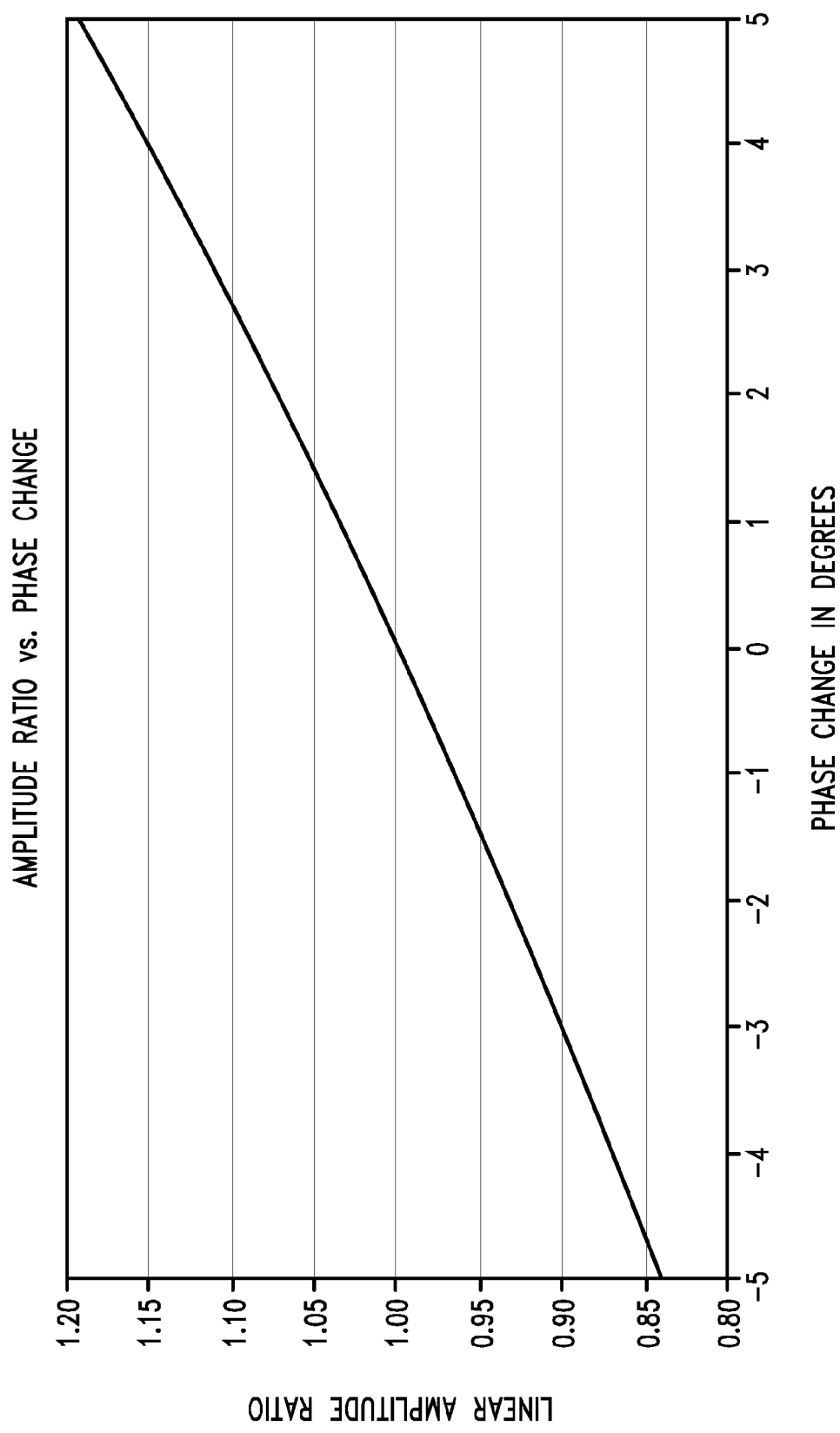
FIG. 18 depicts a linear plot of the amplitude ratio vs. phase change for smaller values of phase.

FIG. 18 depicts a linear plot of the amplitude ratio vs. phase change for smaller values of phase. This is the central portion of the data presented in FIG. 17 above. For some applications, the flow velocities will result in phase changes that are within the range of a few degrees, and thus the relationship between the amplitude ratio and the phase change is nearly a straight line. For applications with a larger phase change, the non-linear relationship between the phase shift and the amplitude ratio can be handled in software using eqn. 3, to provide an accurate phase value.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for measuring a fluid flow with a first transducer and a second transducer comprising:

transmitting a reference signal having a reference phase through the fluid flow from the first transducer to the second transducer;

receiving the reference signal at the second transducer as a received reference signal;

concurrent with at least a portion of transmitting the reference signal, transmitting a first counter-propagating signal having a first phase through the fluid flow from the second transducer to the first transducer;

receiving the first counter-propagating signal at the first transducer as a received first counter-propagating signal;

summing the received reference signal with the received first counter-propagating signal;

determining a first maximum amplitude of the sum of the received reference signal and the received first counter-propagating signal;

concurrent with at least a portion of transmitting the reference signal, transmitting a second counter-propagating signal having a second phase through the fluid flow from the second transducer to the first transducer;

receiving the second counter-propagating signal at the first transducer as a received second counter-propagating signal;

summing the received reference signal with the received second counter-propagating signal;

determining a second maximum amplitude of the sum of the received reference signal and the received second counter-propagating signal; and determining a phase difference between a phase advance induced by the fluid flow on one of the received reference signal relative to the reference phase and the received first counter-propagating signal relative to the first phase and a phase delay induced on one of the received reference signal relative to the reference phase and the received first counter-propagating signal relative to the first phase based upon a ratio of the first maximum amplitude and the second maximum amplitude.

2. The method of claim 1 wherein the reference signal travels with the fluid flow so that the fluid flow induces a phase advance upon the received first counter-propagating signal relative to the first phase.

3. The method of claim 1 wherein the reference signal has a 10 MHz frequency.

4. The method of claim 1 wherein the reference phase is zero degrees.

5. The method of claim 1 wherein the first phase has opposite sign of the second phase.

6. The method of claim 1 wherein the second phase is a 180 degree inversion of the first phase.

7. The method of claim 1, further including determining a difference in time of arrival of the reference signal and the first counter-propagating signal based upon the ratio of the first maximum amplitude and the second maximum amplitude.

8. The method of claim 7 wherein the first phase is +90 degrees and the second phase is −90 degrees.

9. The method of claim 1 wherein the first counter-propagating signal is transmitted at the time period that the second counter-propagating signal is transmitted.

10. The method of claim 1, further including determining rate of the fluid flow based upon the determined difference between the phase advance and the phase delay.

11. A system for a fluid flow comprising:

a circuitry including a signal generator and a phase determiner, the signal generator configured to generate signals;

a first transducer electrically coupled to the circuitry; and a second transducer electrically coupled to the circuitry, the first transducer positionable to transmit a reference signal through the fluid flow to be received by the second transducer, the reference signal generated by the signal generator, the second transducer positionable to transmit a first counter-propagating signal and a second counter-propagating signal through the fluid flow to be received by the first transducer, the first counter-propagating signal and the second counter-propagating signal generated by the signal generator, the reference signal having a reference phase, the first counter-propagating signal having a first phase, the second counter-propagating signal having a second phase, the phase determiner configured to determine a phase difference between a phase advance induced by the fluid flow on one of the received reference signal relative to the reference phase and the received first counter-propagating signal relative to the first phase and a phase delay induced on one of the received reference signal relative to the reference phase and the received first counter-propagating signal relative to the first phase based upon the sum of the reference signal received by the second transducer and the first counter-propagating signal received by the first transducer and the sum of the reference signal received by the first transducer and the second counter-propagating signal received by the second transducer, a portion of the reference signal being received by the second transducer concurrent with the first counter-propagating signal being received by the first transducer and a portion of the reference signal being received by the second transducer concurrent with the second counter-propagating signal being received by the first transducer.

12. The system of claim 11 wherein the phase determiner is configured to determine the phase difference without need of taking a difference between the reference signal received by the second transducer and the first counter-propagating signal received by the first transducer and without need of taking a difference between the reference signal received by the second transducer and the second counter-propagating signal received by the first transducer.

13. The system of claim 11 wherein the reference signal travels with the fluid flow so that the fluid flow induces a phase advance upon the received first counter-propagating signal relative to the first phase.

14. The system of claim 11 wherein the reference signal has a 10 MHz frequency.

15. The system of claim 11 wherein the reference phase is zero degrees.

16. The system of claim 11 wherein the first phase has opposite sign of the second phase.

17. The system of claim 11 wherein the second phase is a 180 degree inversion of the first phase.

18. The system of claim 11, further including determining a difference in time of arrival of the reference signal and the first counter-propagating signal based upon the ratio of the first maximum amplitude and the second maximum amplitude.

19. The system of claim 18 wherein the first phase is +90 degrees and the second phase is −90 degrees.

20. The system of claim 11 wherein the first counter-propagating signal is transmitted at the time period that the second counter-propagating signal is transmitted.

21. The system of claim 11, further including determining rate of the fluid flow based upon the determined difference between the phase advance and the phase delay.

22. A method of a fluid flow comprising:

transmitting from a first transducer a reference signal through the fluid flow to be received by a second transducer;

transmitting a first counter-propagating signal and a second counter-propagating signal through the fluid flow to be received by the first transducer, the reference signal having a reference phase, the first counter-propagating signal having a first phase, the second counter-propagating signal having a second phase; and determining a phase difference between a phase advance induced by the fluid flow on one of the received reference signal relative to the reference phase and the received first counter-propagating signal relative to the first phase and a phase delay induced on one of the received reference signal relative to the reference phase and the received first counter-propagating signal relative to the first phase based upon the sum of the reference signal received by the second transducer and the first counter-propagating signal received by the first transducer and the sum of the reference signal received by the first transducer and the second counter-propagating signal received by the second transducer, a portion of the reference signal being received by the second transducer concurrent with the first counter-propagating signal being received by the first transducer and a portion of the reference signal being received by the second transducer concurrent with the second counter-propagating signal being received by the first transducer.

23. The method of claim 22 wherein determining the phase difference is performed without need of taking a difference between the reference signal received by the second transducer and the first counter-propagating signal received by the first transducer and without need of taking a difference between the reference signal received by the second transducer and the second counter-propagating signal received by the first transducer.

* * * * *